United States Patent [19]

Kobayashi et al.

[11] Patent Number: 4,771,114

[45] Date of Patent: Sep. 13, 1988

[54] PROCESS FOR PRODUCING VINYL CHLORINE RESIN WITH NONIONIC SURFACTANT AND REFLUX CONDENSER

[75] Inventors: Teiji Kobayashi, Takasago; Yoshio Tomishima, Kobe; Taizo Yamamoto, Takasago; Yasuhiro Nojima, Akashi, all of Japan

[73] Assignee: Kanegafuchi Kagaku Kogyo Kabushiki Kaisha, Osaka, Japan

[21] Appl. No.: 80,179

[22] Filed: Jul. 31, 1987

Related U.S. Application Data

[63] Continuation of Ser. No. 832,808, Feb. 25, 1986, abandoned.

[30] Foreign Application Priority Data

Mar. 8, 1985 [JP] Japan .................................. 60-46912

[51] Int. Cl.$^4$ ................................ C08F 2/30
[52] U.S. Cl. ..................... 526/66; 526/209; 526/344.2
[58] Field of Search ................... 526/66, 209

[56] References Cited

U.S. PATENT DOCUMENTS

| | | |
|---|---|---|
| 3,595,848 | 7/1971 | Reinecke et al. .................. 526/200 |
| 3,627,744 | 12/1971 | Hopkins et al. .................. 526/200 |
| 3,980,628 | 9/1976 | Sorenson et al. .................. 526/64 |
| 4,012,573 | 3/1977 | Trieschmann et al. ............. 526/61 |
| 4,050,901 | 9/1977 | Pfeiffer et al. .................... 260/695 |
| 4,056,667 | 11/1977 | Sonnenberg et al. .............. 526/74 |
| 4,061,848 | 12/1977 | Sistig et al. ....................... 526/344 |
| 4,455,413 | 6/1984 | Tomishima et al. .............. 526/344.2 |
| 4,487,899 | 12/1984 | White ................................. 526/74 |
| 4,588,791 | 5/1986 | Bieringer .......................... 526/78 |

Primary Examiner—Christopher Henderson
Attorney, Agent, or Firm—Armstrong, Nikaido, Marmelstein & Kubovcik

[57] ABSTRACT

The present invention provides a process for producing vinyl chloride resin in suspension polymerization of vinyl chloride monomer by the use of a polymerization reactor equipped with a reflux condenser wherein a nonionic surface active agent having a HLB value of 6–14 is added upon initial charging of reactants, polymerization is started in a range of 0.8 to 1.0 of the water/monomer ratio, the polymerization temperature is raised 3° to 10° C. when polymer conversion is not more the 50 weight percent, with water being added in the course of polymerization to not more than make up for the volumetrical contraction resulting from the progress of polymerization so that upon completion of polymerization the water/monomer ratio is controlled in a range of 1.0 to 1.4. The polyvinyl chloride resin obtained by the present process is superior in quality such as high bulk density and little fish eye content with high productivity.

9 Claims, No Drawings

PROCESS FOR PRODUCING VINYL CHLORINE RESIN WITH NONIONIC SURFACTANT AND REFLUX CONDENSER

This application is a continuation of application Ser. No. 832,808, filed Feb. 25, 1986, now abandoned.

BACKGROUND OF THE INVENTION

1. Field of the Invention

The present invention relates to a process for producing vinyl chloride resin, and more particularly to a process for producing vinyl chloride resin with high in polymerization productivity, the resin being high in bulk density and with less fish eye, by the use of a polymerization reactor equipped with a reflux condenser.

2. Description of the Prior Art

In the production of vinyl chloride resin it is often the case that a reflux condenser is used for improving productivity as well as for energy-saving but this is accompanied by problems in that suspension polymerization under cooling by a reflux condenser often causes an increased porosity in the particle interior and affects the smoothness of the particle's surface and the resulting deterioration of the filling property causes lowering of the bulk density and an increase of fish eyes. Moreover, the use of the reflux condenser causes a violent bubbling phenomenon in the middle stage of polymerization and thereafter. As to bulk density, it is well known that is correlated with a vinyl chloride resin's productivity in processing and lowering of bulk density is known to cause lowering of an extruder's output to thus result in reduction of productivity in processing. As means of improving a polyvinyl chloride's bulk density there is known, for instance, a method of adding vinyl chloride monomer in the course of polymerization (Japanese Laid-Open Patent Application No. 97679/75) but the vinyl chloride resin obtained by this process is known to have many fish eyes and, moreover, the residual monomer in the resin is difficult to remove.

Meanwhile, the market's need for less fish eye content in vinyl chloride resin (hereinafter referred to as "PVC") has been increasing year after year and the fish eye contact of PVC plasticized with a high polymer plasticizer of relatively low plasticizing ability and high viscosity such as of the polyester series has been a problem. In order to solve the problem of fish eye, content it is recommended to prevent formation of low-porosity particles caused by low dispersion frequency through the best possible improvement of the dispersion-coalescence frequency of monomer droplets, and also to improve the homogeneity of particles in the polymerized system by allowing local monomer addition polymerization of the monomer condensed in the reflux condenser to take place in the top layer of polymer suspension as a result of inhibiting bubbling in the middle stage of polymerization and thereafter. When a reflux condenser is used, gas generating from the monomer droplets are contained in the polymer suspension and result in lower homogeneity attainable by stirring and cause an increase in fish eye content due to a bubbling phenomenon in which polymer particles form a floating creamy layer on the polymer suspension in the middle stage of polymerization and thereafter.

Further, when the bubbling phenomenon is marked, there is caused another problem in that the polymer suspension overflows into the reflux condenser and its piping and cause deposition of scales to adversely affect the product's quality, also causing lowering of the heat-removing capacity of the reflux condenser and seriously affecting the safety control of the producing process.

SUMMARY OF THE INVENTION

The object of the present invention is to provide a process for producing PVC by the use of a polymerization reactor equipped with a reflux condenser which is free from the above-mentioned problems of the conventional process, said PVC being higher in bulk density and having less fish eye content.

Another object of the present invention is to provide a process for producing PVC with less fish eye content by the use of a high polymer plasticizer.

Still another object of the present invention is to provide a process for producing PVC with less bubbling phenomenon, wherein it is possible to increase the monomer charge without risk of the suspension overflowing into the piping and the interior of the reflux condenser, and characterized by a shortened time required for polymerization, these together resulting in a high productivity of PVC.

Further objects and features of the present invention will be apparent from a reading of the following description.

After their intensive studies the present inventors discovered that the above objects can be accomplished by adding a specified class of nonionic surface active agents, controlling the water/monomer ratio within a fixed range and modifying the polymerization temperature in the course of polymerization.

DETAILED DESCRIPTION OF THE INVENTION

The present invention relates to a process for producing PVC wherein in suspension polymerization of vinyl chloride monomer and other monomers capable of copolymerizing therewith by the use of a polymerization reactor equipped with a reflux condenser in the gas phase portion of the polymerization reactor or outside the polymerization reactor, a nonionic surface active agent having a hydrophile-lipophile-balance (HLB) value ranging 6-14 is added in a range of 0.001-0.1 parts by weight to 100 weight of vinyl chloride monomer and other monomers copolymerizable therewith, the water/monomer ratio of initial charging is controlled in a range of 0.8.-1.0, polymerization is conducted in the first stage of polymerization to not more than 50 weight percent in polymer conversion, then the second stage of polymerization is conducted at a temperature 3°-10° C. higher than the polymerization temperature in the first stage, with water being added continuously or intermittently in the course of polymerization to not more than make up for the volumetrical contraction resulting from the progress of polymerization so that upon completion of polymerization the water/monomer ratio is controlled in a range of 1.0-1.4.

Normally it is known that the degree of lowering of a resin's bulk density when a reflux condenser is used increases with increasing quantity of heat removed by the reflux condenser (hereinafter referred to as "Qrc"). As in the present invention (1) to set the water/monomer ratio at the time of initial charging to be small (i.e. increasing the charge amount of vinyl chloride monomer) and (2) to shift the polymerization temperature from a low to high level are means of enhancement of the generation of heat in the course of polymerization. Meanwhile, since there is a certain innate limit to the heat removing capacity of a reactor jacket it is considered inevitable to that an increase in the Qrc of the reflux condenser would be counter to the desired increase in bulk density. Surprisingly, however, the present inventors discovered that these two technical means enable substantial increase of Qrc without causing lowering of the bulk density and even marked increase of the bulk density could be hoped for.

Moreover, by addition of a nonionic surface active agent having HLB value of 6–14 to the reaction system, the bubbling phenomenon in the middle stage of polymerization and thereafter is not only suppressed because of increased wettability to water of the surface of PVC particles, but the dispersion-coalescence frequency of monomer droplets is enhanced since the interfacial tension of polymerization suspension liquid lowers even when the reflux condenser was operated from the initial stage of polymerization, which synergistically acts to thus decrease the fish eye content dramatically.

The present invention has been completed on the discovery that by the combination of three requirements, i.e., (a) addition of a specified class of nonionic surface active agents, (b) initial water/monomer ratio of 0.8–1.0 and addition of water during polymerization, and (c) changing the polymerization temperature in the course of polymerization, the problems attendant on the industrial utilization of the reflux condenser such as decrease in bulk density, deterioration in fish eye content, bubbling phenomenon etc., can be solved at a stroke.

The nonionic surface active agents used in the process of the present invention should have a HLB value between 6 and 14, more preferably between 8 and 13. In the case of less than 6, the surface active ability is too low to improve the fish eye content, and in the case of more than 14, the bubbling-suppression effect in and after the middle stage of polymerization decreases owing to reduced wettability of the surface of the PVC particles.

As nonionic surface active agents used in the process of the present invention, there are included polyoxyethylene alkyl ether, polyoxyethylene alkylphenyl ether, sorbitan fatty acid ester, polyoxyethylene sorbitan fatty acid ester, polyoxyethylene fatty acid ester, oxyethylene-oxypropylene block copolymer etc., and these are used singly or in combination of two or more.

The nonionic surface active agent is added in a range of 0.001–0.1 parts by weight, more preferably 0.003–0.05 parts by weight to 100 parts by weight of vinyl chloride monomer and other monomer copolymerizable therewith. In the case of less than 0.001 parts by weight, a sufficient effect of the present invention is not obtained, and in the case of exceeding 0.1 parts by weight, adverse effects to qualities of the product appear.

The nonionic surface active agent should be added upon charging of reactants and it may, if necessary, further be added in the course of polymerization. For improvement of fish eye content, it is an important point to raise the dispersion-coalescence frequency of monomer droplets in the polymer particle forming step at the initial polymerization stage and to enhance the homogeneity of polymer particles in the polymerization system, and in this sense, it is an essential requisite to add the nonionic surface active agent at the time of initial charging. If the nonionic surface active agent with a HLB value between 6 and 14 is employed, the bubbling-suppression effect in the middle stage of polymerization and thereafter is attained even when it is added upon charging of reactants. When added once upon initial charging, the surface active agent is, of course, added in an amount as aforesaid, but when it is added partly upon initial charging and the remainder is added continuously or intermittently in the course of polymerization, it is recommendable to add it in such a manner that the amount added upon initial charging be not less than 0.001 parts by weight, more preferably, not less than 0.002 parts by weight and the total amount after completion of addition in the course of polymerization be not more than 0.1 parts by weight, more preferably, not more than 0.05 parts by weight.

The present invention features setting the water/monomer ratio at the time of initial charging within a range of 0.8–1.0 (ratio by weight, hereinafter the same applies) and controlling the water/monomer ratio upon completion of polymerization within a range of 1.0–0.4, preferably within a range of 1.0–1.2, by adding water continuously or intermittently in the course of polymerization with care not to exceed the volumetrical contraction resulting from the progress of polymerization.

The addition of water is to be done continuously or intermittently to make up for the volumetrical contraction resulting from progress of polymerization, but it is preferred to be done continuously when the stability of the product's quality, controllability of polymerization temperature and desired prevention of bubbling etc. are taken into consideration.

The volumetrical contraction resulting from progress of polymerization ($\Delta V$) is the quantity calculated by the following formula.

$$\Delta V = (\text{Monomer charging}) \times (\text{Conversion}) \times [(1/\text{monomer density}) - (1/1.4)]$$

When the water/monomer ratio at the time of initial charging is less than 0.8, coarse particles are generated, while when it is in excess of 1.0. reduced is the bulk density increasing effect.

When the water/monomer ratio upon completion of polymerization is less than 1.0, the particle size becomes rough and the bulk density tends to get lower, whereas, when the amount of water added should be more than enough to make up for the volumetrical contraction, it results in increase of slurry volume in the polymerization system to result in extreme cases in overflowing of the polymer slurry into the piping or the interior of the reflux condenser to cause deposition of scales and this results in deterioration of quality (fish eye content). Hence, the water/monomer ratio upon completion of polymerization should be not more than 1.4, preferably not exceeding 1.2.

Further, the present invention features that polymerization is conducted in the first stage to not more than 50 weight percent in terms of polymer conversion and polymerization in the second stage is conducted at a temperature 3°–10° C. higher than in the first stage. The conversion when the polymerization temperature is changed is not more than 50 weight percent, preferably 10–50 weight percent and more preferably 15–50 weight percent. If it is less than 10 weight percent, fish eye content tends to increase, while, when it is in excess of 50 weight percent, bulk density increasing effect is reduced.

As other monomers which can be copolymerized with vinyl chloride in the process of the present invention there are, for instance, olefins such as ethylene and propylene, vinyl esters such as vinyl acetate and vinyl stearate, (meth) acrylate esters such as methyl acrylate and methyl methacrylate, esters or anhydrides of acids such as maleic acid and fumaric acid, nitrile compounds such as acrylonitrile and vinylidene compounds such as vinylidene chloride.

As polymerization initiators used in the process of the present invention, there are included initiators normally used for suspension polymerizaton of vinyl chloride namely organic peroxides such as lauroyl peroxide, 3,5,5-trimethylhexanoyl peroxide, t-butyl peroxypivalate, t-butyl peroxyneodecanoate, di-isopropyl peroxydicarbonate, di-2-ethylhexyl peroxydicarbonate and acetyl cyclohexyl-sulfonyl peroxide, and azo compounds such as $\alpha,\alpha'$-azobis-isobutylonitrile and $\alpha, \alpha'$-azobis-2,4-dimethyl valeronitrile. These are used singly or in combination with two or more.

As suspending agents used in the process of the present invention are known suspending agents such as partially saponified polyvinyl alcohol, vinyl acetate-maleic anhydride copolymer, styrene-maleic anhydride copolymer, polyvinyl pyrolidone, gelatine, starch, methyl cellulose, hydroxypropyl methylcellulose and polyethylene oxide either alone or in combination but of these, preferred are partially saponified polyvinyl alcohol and/or hydroxypropyl methylcellulose for quality, polymerization stability etc. The preferred dose of the above-mentioned suspending agent is 0.01-1 weight part per 100 weight parts of vinyl chloride monomer, although there is no particular limit to it.

In the process of the present invention it is also possible to use a molecular weight adjusting agent.

The initiator, suspending agent and molecular weight adjusting agent etc. may be added at once to the polymerization system at the beginning of polymerization and it is as well possible to add them in portions in the course of polymerization.

The polymerization temperature in the process of the present invention may normally be in the range of 40°–75° C., although there is no particular limit to it.

According to the present invention, it is possible to conduct suspension polymerization by the use of a polymerization reactor equipped with a reflux condenser for production of PVC high in bulk density with less fish eye and it is also possible to increase the monomer charge without risk of the suspension overflowing into the piping or the interior of the reflux condenser, which along with shortening of the polymerization time enables sizable improvement of productivity, the industrial significance of the present invention being thus remarkable.

Hereafter examples of the present invention are given as well as control examples but these mean no limitation of the present invention.

In the description below evaluation of the product's quality was made by the following methods.

Bulk density: According to JIS K-6721.
Particle size distribution: Sifting and shaking method.
Porosity:

Porosity was determined by the use of mercury compression type porosimeter of Aminco Inc., U.S.A. (Model 5-7118) through measurement of the volume of mercury pressed in per 100 g PVC at an absolute of 31–1011 psi (pore size 0.17–5.8 $\mu$m).

Fish eye:

100 parts by weight of PVC obtained by polymerization, 50 parts by weight of plasticizer [PN 250 (adipic acid-type polyester : molecular weight approx. 2,000), maker : Adeca Argus Inc.], 3 parts by weight of tribase, 0.5 parts by weight of stearic acid, 0.4 parts by weight of titanium dioxide and 0.2 parts by weight of carbon black were mixed, after still-standing for 3 hours the mixture was milled through 8 inch rolls at 150° C. (sheet thickness: 0.2 mm). Sheets were cut out after 8 minutes and 10 minutes of milling and the number of transparent particles (fish eyes) per 5 cm×5 cm sheet were counted.

EXAMPLE 1

90 parts by weight of water having dissolved in it 0.07 parts by weight of partially saponified polyvinyl alcohol were charged into a polymerization reactor 1.7 m$^3$ in capacity equipped with a reflux condenser having a heat transfer area of 5 m$^2$, 0.024 parts by weight of di-2-ethylhexyl peroxy-di-carbonate and 0.024 parts by weight of t-butyl peroxy-neodecanoate were added as initiators, and 0.01 parts by weight of sorbitan monolaurate (HLB: 8.6) was further added, then 100 parts by weight of vinyl chloride monomer (682 kg) was charged after deaeration, the temperature was raised to 54° C. (polymerization temperature in the first stage) for polymerization to start, flow of cooling water was started through the reflux condenser when the polymer conversion reached 3% and polymerization was conducted with Qrc being adjusted to 27,500 kcal/hr from the 30 minutes on after the start of flowing cooling water. When the polymer conversion has reached 35%, the polymerization temperature was raised to 59° C. (polymerization temperature in the second stage) and polymerization was continued with Qrc readjusted to 40,000 kcal/hr, the operation of the reflux condenser was stopped when the inside pressure lowered 1 kg/cm$^2$ from the steady pressure corresponding to the polymerization temperature in the second stage to recover the unpolymerized monomer, the slurry was then dehydrated and dried in a fluidized bed drier for PVC to be obtained. From immediately after the start of polymerization water was continuously added at a constant rate by the use of a reciprocating pump all through the period of polymerization so that the water/ monomer ratio at the start of recovery (upon completion of polymerization) was adjusted to 1.1 (total amount of water added: 20 weight parts).

The resulting PVC was quite satisfactory with regard to bulk density and fish eye content as shown in Table 1 with no indication of polymer suspension overflowing into the reflux condenser.

EXAMPLE 2

Polymerization was conducted in the same way as in Example 1 except that the amount of sorbitan monolaurate was changed to 0.0015 parts by weight and the resulting polymer was dehydrated and dried.

The resulting PVC was satisfactory with regard to bulk density and fish eye content as shown in Table 1 with no indication of polymer suspension overflowing into the reflux condenser.

EXAMPLE 3

Polymerization was conducted as in Example 1 except that the nonionic surface active agent was changed from sorbitan monolaurate to polyoxyethylene nonylphenyl ether (HLB: 12.4) and the resulting polymer was dehydrated and dried.

The obtained polymer was satisfactory in bulk density and fish eye content as shown in Table 1 without indication of overflowing of the polymer suspension into the reflux condenser.

EXAMPLE 4

Polymerization was conducted in the same way as in Example 1 except that the polymerization temperature was changed when the conversion reached 50% and the polymer was dehydrated and dried.

The resulting PVC was satisfactory with regard to bulk density and fish eye content as shown in Table 1 with no indication of overflowing of polymer suspension into the reflux condenser.

EXAMPLE 5

Polymerization was conducted in the same way as in Example 1 except that the polymerization temperature in the first stage was adjusted to 52° C. and that in the second stage to 62° C. and the Qrc of the reflux condenser at the polymerizing temperatures in the first and second stages were adjusted to 22,500 kcal/hr and 47,500 kcal/hr respectively and the polymer was dehydrated and dried.

The resulting PVC was satisfactory with regard to bulk density and fish eye content as shown in Table 1 with no indication of overflowing of polymer suspension into the reflux condenser.

EXAMPLE 6

Polymerization was conducted in the same way as in Example 1 except that the water/monomer ratio at the time of initial charging was adjusted to 1.0 without changing the total charging volume and 651 kg of vinyl chloride monomer was charged and water was added so that the water/monomer ratio at the time of starting recovery of unpolymerized monomer was adjusted to 1.4 (total amount of water added: 40 weight parts) and Qrc at the polymerization temperatures in the first and second stages were adjusted to 26,500 kcal/hr and 38,000 kcal/hr respectively and the polymer was dehydrated and dried.

The resulting PVC was satisfactory with regard to bulk density and fish eye content as shown in Table 1 with no indication of overflowing of polymer suspension into the reflux condenser.

CONTROL EXAMPLE 1

Polymerization was conducted in the same way as in Example 1 except that sorbitan monolaurate was not added. Overflowing of polymer suspension was observed and the resulting PVC contained a lot of fish eyes. The result is shown in Table 2.

CONTROL EXAMPLES 2~3

Polymerization was conducted in the same way as Example 1 except that the kind of nonionic surface active agent was changed.

Both polymers obtained by Control Example 2 (sorbitan monostearate, HLB: 4.7) and Control Example 3 (polyoxyethylene sorbitan monolaurate, HLB: 16.7) were inferior in fish eye content.

CONTROL EXAMPLE 4

Polymerization was conducted in the same way as Example 1 except that sorbitan monolaurate was added continuously from the time the conversion reached 20% to the completion of polymerization, without addition at the time of initial charging.

As shown by Table 2, though there was observed no flowing of polymer suspension into the reflux condenser, the resulting PVC was inferior in fish eye content.

CONTROL EXAMPLE 5

Polymerization was conducted in the same way as in Example 1 except that the polymerization temperature was changed when the conversion reached 60%. The resulting PVC was low in bulk density, as apparent from Table 2.

CONTROL EXAMPLE 6

Polymerization was conducted in the same way as in Example 1 except that the polymerization temperature was set at 57° C. for both first and second stages and Qrc was adjusted to 34,000 kcal/hr. The resulting PVC was low in bulk density, as apparent from Table 2.

CONTROL EXAMPLE 7

Polymerization was conducted in the same way as in Example 1 except that the polymerization temperature in the first stage was set at 49.5° C. and that in the second stage at 65° C. and Qrc at the polymerization temperatures in the first and second stages was adjusted to 17,000 kcal/hr and 51,000 kcal/hr respectively. The resulting PVC had a lot of fish eyes, as apparent from Table 2.

CONTROL EXAMPLE 8

Polymerization was conducted in the same way as in Example 1 except that the water/monomer ratio at the time of initial charging was adjusted to 0.7 without changing the total charging volume and 755 kg of vinyl chloride monomer was charged and water was added so that the water/monomer ratio at the time of starting recovery was adjusted to 1.1 (total amount of water added: 40 weight parts) and Qrc at the polymerization temperatures in the first and second stages were adjusted to 30,000 kcal/hr and 44,000 kcal/hr respectively. The resulting PVC contained a lot of coarse particles, as shown by Table 2.

CONTROL EXAMPLE 9

Polymerization was conducted in the same way as in Example 1 except that the water/monomer ratio at the time of initial charging was adjusted to 1.1 without changing the total charging volume (charged quantity of vinyl chloride monomer: 622 kg) and water was added so that the water/monomer ratio at the time of starting recovery was adjusted to 1.4 (total amount of water added: 30 weight parts) and Qrc at the polymerization temperatures in the first and second stages were adjusted to 25,400 kcal/hr and 36,000 kcal/hr respectively. The resulting PVC was low in bulk density, as shown by Table 2.

CONTROL EXAMPLE 10

Polymerization was conducted in the same way as in Example 1 except that sorbitan monolaurate was not added, the water/monomer ratio at the time of initial charging was adjusted to 1.2 without changing the total charging volume (charged quantity of vinyl chloride monomer: 600 kg) and no water was added in the course of polymerization and Qrc was adjusted to 30,000 kcal/hr throughout the polymerization. As shown by Table 2, overflowing of polymer suspension was observed, and the resulting PVC was low in bulk density and had a lot of fish eyes.

CONTROL EXAMPLE 11

120 parts by weight of water having dissolved in it 0.07 weight parts of partially saponified polyvinyl alcohol was charged into a polymerization reactor 1.7 m³ in capacity. 0.024 weight part of di-2-ethylhexyl peroxydi-carbonate and 0.024 weight part of t-butyl peroxyneodecanoate were added as initiators, 100 parts by weight of vinyl chloride monomer (600 kg) were charged after deaeration, the temperature was raised to 57° C. for polymerization to start, unpolymerized monomer was recovered when the inside pressure lowered 1 kg/cm² from the steady pressure corresponding to the polymerization temperature, then the slurry was dehydrated and dried in a fluidized bed drier for PVC to be obtained. In the course of polymerization no addition of water was made and no reflux condenser was used. The results were given in Table 2. The resulting PVC was 0.525 in bulk density and contained 80 fish eyes at 8th minute and 25 at 10th minute.

TABLE 1

| | Example | | | | | |
|---|---|---|---|---|---|---|
| | 1 | 2 | 3 | 4 | 5 | 6 |
| Reflux condenser | Used | " | " | " | " | " |
| Nonionic surface active agent | Sorbitan monolaurate | " | Polyoxyethylene nonylphenyl ether | Sorbitan monolaurate | " | " |
| HLB | 8.6 | " | 12.4 | 8.6 | " | " |
| Amount added | 0.01 | 0.0015 | 0.01 | 0.01 | " | " |
| Time of addition | Upon charging | " | " | " | " | " |
| Water/monomer ratio | | | | | | |
| Time/initial charging | 0.9 | " | " | " | " | 1.0 |
| Start of recovery | 1.1 | " | " | " | " | 1.4 |
| Initial charge/monomer (kg) | 682 | " | " | " | " | 651 |
| Water added (wt. parts) | 20 | " | " | " | " | 40 |
| Polymerizing temp. (°C.) | | | | | | |
| 1st stage | 54 | " | " | " | 52 | 54 |
| 2nd stage | 59 | " | " | " | 62 | 59 |
| Time of changing temp. (Conversion %) | 35 | " | " | 50 | 35 | " |
| Qrc (kcal/hr) | | | | | | |
| 1st stage | 27500 | " | " | " | 22500 | 26500 |
| 2nd stage | 40000 | " | " | " | 47500 | 38000 |
| Overflowing into R. Condenser | None | " | " | " | " | " |
| Particle size distribution (%) | | | | | | |
| 60 mesh on | 0 | 0 | 0 | 0 | 0 | 0 |
| 60–100 mesh | 25 | 23 | 27 | 24 | 24 | 22 |
| 100–145 mesh | 67 | 66 | 68 | 66 | 67 | 68 |
| 145–200 mesh | 8 | 11 | 5 | 10 | 9 | 10 |
| 200 mesh pass | 0 | 0 | 0 | 0 | 0 | 0 |
| Porosity (cc/100 g) | 25.0 | 24.8 | 25.1 | 25.3 | 24.0 | 25.5 |
| Bulk density | 0.540 | 0.538 | 0.532 | 0.531 | 0.543 | 0.530 |
| Fish eye (piece/5 cm × 5 cm) | | | | | | |
| 8th minute | 72 | 78 | 74 | 70 | 78 | 71 |
| 10th minute | 21 | 23 | 23 | 19 | 25 | 19 |

TABLE 2

| | Control Example | | | | | | | | | | |
|---|---|---|---|---|---|---|---|---|---|---|---|
| | 1 | 2 | 3 | 4 | 5 | 6 | 7 | 8 | 9 | 10 | 11 |
| Reflux condenser | Used | " | " | " | " | " | " | " | " | " | Not used |
| Nonionic surface active agent | None | Sorbitan monostearate | Polyoxyethylene sorbitan monolaurate | Sorbitan monolaurate | " | " | " | " | " | None | None |
| HLB | None | 4.7 | 16.7 | 8.6 | " | " | " | " | " | None | None |
| Amount added | None | 0.01 | 0.01 | 0.01 | " | " | " | " | " | None | None |
| Time of addition | None | Upon charging | " | Continuous addition* | Upon charging | " | " | " | " | None | None |
| Water/monomer ratio | | | | | | | | | | | |
| Time/initial charging | 0.9 | " | " | " | " | " | " | 0.7 | 1.1 | 1.2 | " |
| Start of recovery | 1.1 | " | " | " | " | " | " | 1.1 | 1.4 | 1.2 | " |
| Initial charge/monomer (kg) | 682 | " | " | " | " | " | " | 755 | 622 | 600 | " |
| Water added (wt. parts) | 20 | " | " | " | " | " | " | 40 | 30 | — | — |
| Polymerizing temp. (°C.) | | | | | | | | | | | |
| 1st Stage | 54 | " | " | " | " | 57 | 49.5 | 54 | 54 | 57 | " |
| 2nd Stage | 59 | " | " | " | " | 57 | 65 | 59 | 59 | 57 | " |

TABLE 2-continued

| | Control Example | | | | | | | | | | |
|---|---|---|---|---|---|---|---|---|---|---|---|
| | 1 | 2 | 3 | 4 | 5 | 6 | 7 | 8 | 9 | 10 | 11 |
| Time of changing temp. (Conversion %) | 35 | " | " | " | 60 | — | 35 | 35 | 35 | — | — |
| Qrc (kcal/hr) | | | | | | | | | | | |
| 1st Stage | 27500 | " | " | " | " | 34000 | 17000 | 30000 | 25400 | 30000 | — |
| 2nd Stage | 40000 | " | " | " | " | 34000 | 51000 | 44000 | 36000 | 30000 | — |
| Overflowing into R. Condenser | Present | None | Present | None | None | None | None | None | None | Present | — |
| Particle size distribution (%) | | | | | | | | | | | |
| 60 mesh on | 0 | 0 | 0 | 0 | 0 | 0 | 0 | 20 | 0 | 0 | 0 |
| 60-100 mesh | 20 | 46 | 18 | 21 | 24 | 23 | 26 | 53 | 20 | 12 | 11 |
| 100-145 mesh | 65 | 48 | 65 | 67 | 66 | 67 | 67 | 25 | 69 | 70 | 68 |
| 145-200 mesh | 13 | 5 | 15 | 12 | 10 | 9 | 7 | 2 | 11 | 17 | 20 |
| 200 mesh pass | 2 | 1 | 2 | 0 | 0 | 1 | 0 | 0 | 0 | 1 | 1 |
| Porosity (cc/100 g) | 24.0 | 23.6 | 25.2 | 24.7 | 26.0 | 26.8 | 21.8 | — | 26.6 | 27.5 | 25.0 |
| Bulk density | 0.535 | 0.530 | 0.520 | 0.537 | 0.518 | 0.513 | 0.550 | — | 0.515 | 0.500 | 0.525 |
| Fish eye (piece/5 cm × 5 cm) | | | | | | | | | | | |
| 8th minute | 375 | 250 | 175 | 243 | 68 | 67 | 213 | — | 65 | 334 | 80 |
| 10th minute | 140 | 125 | 72 | 85 | 17 | 16 | 75 | — | 15 | 129 | 25 |

*Continuous addition from the conversion 20% to the completion of polymerization

What is claimed is:

1. A process for producing vinyl chloride resin in a suspension polymerization system of vinyl chloride monomer which optionally contains at least one other monomer capable of copolymerizing therewith selected from the group consisting of olefins, vinyl esters, acrylate or methacrylate esters, esters or anhydrides of acids, nitrile compounds and vinylidene compounds, by the use of a polymerization reactor equipped with a reflux condenser in the gas phase portion of the polymerization reactor or outside the polymerization reactor, characterized by the improvement wherein a nonionic surface active agent having a HLB value in the range of 6-14 selected from the group consisting of polyoxethylene alkyl ether, polyoxyethylene alkylphenyl ether, sorbitan fatty acid ester, polyoxyethylene sorbitan fatty acid ester, polyoxyethylene fatty acid ester and oxyethylene oxypropylene block copolymer is added in an amount of 0.001-0.1 parts by weight to 100 parts by weight of vinyl chloride monomer and other monomers copolymerizable therewith, essentially all of said surface active agent being added at the time of initial charging of the vinyl chloride monomer and other reactants, the water/monomer ratio of the initial charging is controlled in the range of 0.8-1.0, polymerization is conducted in a first stage of polymerization to reach not more than 50 weight percent in polymer conversion, then in a second stage of polymerization, polymerization is conducted at a temperature 3°-10° C. higher than the polymerization temperature in the first stage, with water being added continuously or intermittently in the course of polymerization to not more than make up for the volumetrical contraction resulting from the progress of polymerization so that upon completion of polymerization the water/monomer ratio is maintained in the range of 1.0-1.4.

2. The process of claim 1, wherein at least one suspending agent selected from the group consisting of partially saponified polyvinyl alcohol and hydroxypropyl methylcellulose is used in the polymerization system.

3. The process of claim 1, wherein the nonionic surface active agent has a HLB value in the range of 8-13.

4. The process of claim 1, wherein the nonionic surface active agent is added in an amount of 0.003-0.05 parts by weight to 100 parts by weight of vinyl chloride monomer and other monomers copolymerizable therewith.

5. The process of claim 1, wherein the nonionic surface active agent is added only once upon initial charging of reactants, without being added in the course of polymerization.

6. The process of claim 1, wherein the nonionic surface active agent is added upon initial charging of reactants in an amount of 0.001 parts by weight or more to 100 parts by weight of vinyl chloride monomer and other monomers copolymerizable therewith.

7. The process of claim 1, wherein the nonionic surface active agent is added upon initial charging of reactants in an amount of 0.002 parts by weight or more to 100 parts by weight of vinyl chloride monomer and other monomers copolymerizable therewith.

8. The process of claim 1, wherein the water/monomer ratio upon completion of polymerization is maintained with the range of 1.0-1.2.

9. The process of claim 1, wherein the first stage of polymerization is shifted to the second stage of polymerization within polymer conversion of 10-50 weight percent.

* * * * *